US008285871B2

(12) United States Patent
Matsumoto (10) Patent No.: US 8,285,871 B2
(45) Date of Patent: Oct. 9, 2012

(54) ROUTE CALCULATION SYSTEM, NETWORK MANAGEMENT DEVICE, ROUTE CALCULATION ENGINE, ROUTE CALCULATION METHOD AND PROGRAM PRODUCT

(75) Inventor: Yuzo Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 481 days.

(21) Appl. No.: 12/564,403

(22) Filed: Sep. 22, 2009

(65) Prior Publication Data

US 2010/0077103 A1  Mar. 25, 2010

(30) Foreign Application Priority Data

Sep. 25, 2008 (JP) .............................. P2008-245508

(51) Int. Cl.
*G06F 15/16* (2006.01)
(52) U.S. Cl. ........................ 709/241; 709/242
(58) Field of Classification Search .................. 709/241, 709/220, 242; 370/238
See application file for complete search history.

(56) References Cited

U.S. PATENT DOCUMENTS

| | | | | |
|---|---|---|---|---|
| 6,654,803 | B1 * | 11/2003 | Rochford et al. | 709/224 |
| 7,215,644 | B2 * | 5/2007 | Wu et al. | 370/248 |
| 7,301,911 | B2 * | 11/2007 | Mack-Crane et al. | 370/254 |
| 7,355,979 | B2 * | 4/2008 | Nishioka et al. | 370/238 |
| 8,018,876 | B2 * | 9/2011 | Johri et al. | 370/255 |
| 2006/0083251 | A1 * | 4/2006 | Kataoka et al. | 370/400 |
| 2006/0200579 | A1 * | 9/2006 | Vasseur et al. | 709/238 |
| 2007/0263544 | A1 * | 11/2007 | Yamanaka et al. | 370/238 |

FOREIGN PATENT DOCUMENTS

JP  2006165920 A  6/2006

* cited by examiner

*Primary Examiner* — Kevin Bates (57) ABSTRACT

A network management device includes a topology information generation unit which generates topology information of multi-layer network, a link identification information setting unit which sets identification information to identify links of the multi-layer network, a topology information transmission unit which transmits, to a route calculation engine, the topology information of the multi-layer network generated by the topology information generation unit, a shortest route calculation request transmission unit which transmits, to the route calculation engine, a calculation request of a shortest route, a multi-layer restriction checking unit which checks a restriction condition to the shortest route information received from the route calculation engine, based on the identification information of each link set by the link identification information setting unit, and an exception link selection unit which selects an exception link when the shortest route information transmitted from the route calculation engine does not satisfy the restriction condition of the multi-layer, wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied.

4 Claims, 6 Drawing Sheets

ROUTE CALCULATION SYSTEM, NETWORK MANAGEMENT DEVICE, ROUTE CALCULATION ENGINE, ROUTE CALCULATION METHOD AND PROGRAM PRODUCT

Priority is claimed on Japanese Patent Application No. 2008-245508 filed on Sep. 25, 2008, the contents of which are incorporated herein by reference.

BACKGROUND OF THE INVENTION

1. Field of the Invention

The present invention relates to a route calculation system, a network management device, a route calculation engine, a route calculation method and a program product.

2. Description of Related Art

In a shortest route calculation system in a network, when a network management device sends a shortest route calculation request to a route calculation engine, the route calculation engine calculates the shortest route based on a shortest route calculation algorithm, and transmits the calculation result to the network management device. However, a conventional shortest route calculation algorithm does not have a concept of a layer hierarchy, and similarly treats both a link between same layers but a link between an upper layer and lower layer as a link merely. Therefore in a calculation of a shortest route of a multi-layer network, sometimes a wrong route is calculated.

As system which transmits a plurality of data through a same transmission route, there are a WDM (Wavelength Division Multiplexing) which transmits a plurality of data whose wavelength are different from each other, and a TDM (Time Division Multiplexing) which arranges a plurality of data in time sequence and transmits them. In some networks, a plurality of layers whose system are different exist, and multi-layer network is built. In these multi-layer network, there is a restriction condition resulting from striding a border between layers.

Figure 10:
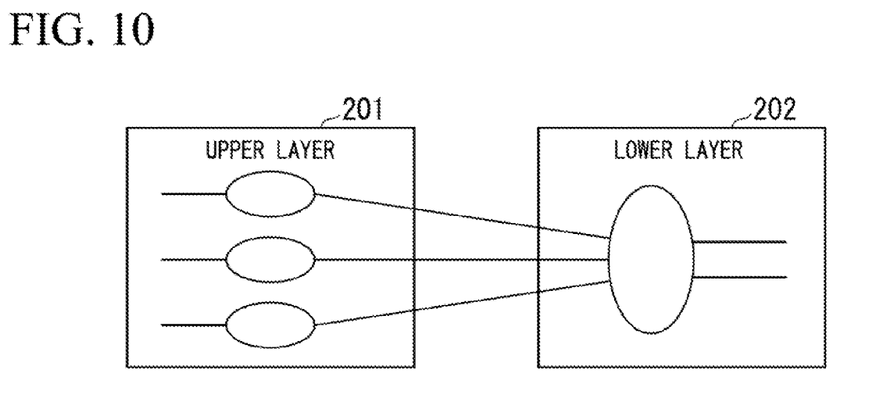
FIG. 10 is a schematic figure of a multi-layer network.
Figure 11:
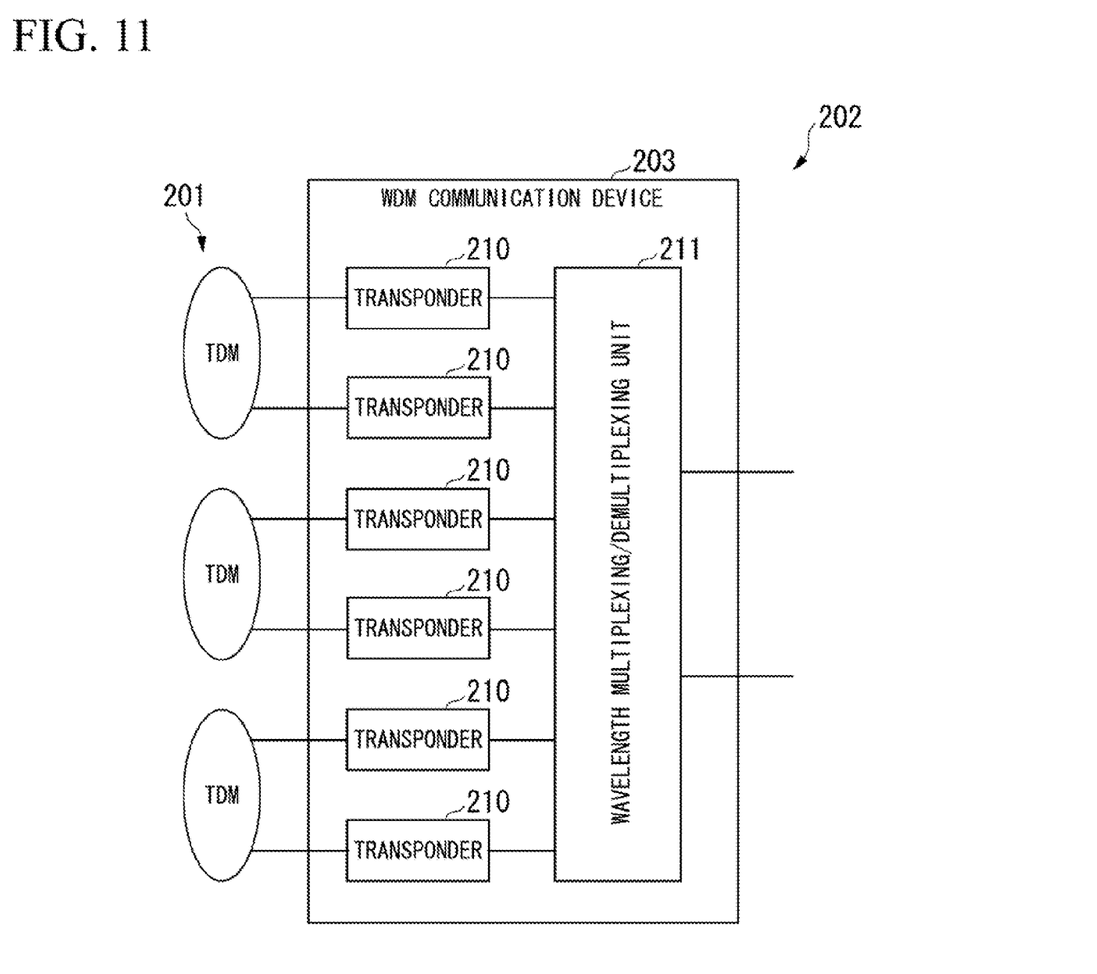
FIG. 11 is a schematic figure of a multi-layer network.

For example, in a border between an upper layer and a lower layer, as shown in FIG. 10, it is necessary to exchange the upper layer 201 and the lower layer 202. As shown in FIG. 11, when the upper layer 201 is a TDM network and the lower layer 202 is WDM network, a WDM communication device 203 includes a converter which includes transponders 210 which relays each TDM data, and a wavelength multiplexing/demultiplexing unit 211. Therefore the WDM communication device 203 can exchange the TOM network 201 and the WDM network 202. This converter performs an wavelength multiplexing to signal from the TDM network, and transmits the signal to the WDM network. Alternatively, the converter performs an wavelength demultiplexing to signal from the WDM network, and transmits the signal to the TDM network. The converter can transfer data from one TDM network to another TDM network. In this case, there is not a path like TDM-WDM-TDM physically, this become a restriction condition when a link is across a layer.

A conventional shortest route calculation algorithm does not have a concept of a layer hierarchy, and similarly treats both a link between same layers and a link between an upper layer and lower layer as a link merely. Therefore sometimes the aforementioned restriction condition is not satisfied, and a wrong route is determined.

In regard to a shortest route selection method which calculates a shortest route in a network, for example, a Patent Document 1 (Japanese Unexamined Patent Publication, First Publication No. 2006-165920) is known. The Patent Document 1 discloses that route information about a link which connects a domain of an initial point and a node of the initial point, a link which connects a domain of an end point and a node of the end point, a link which connects the domain of the initial point and the domain of the end point, and permutation of domains is stored.

However the shortest route selection method disclosed in the Patent Document 1 calculates a route only when layers are different between domains, and is not possible to calculate a route for multi-layer in a global network, without domain. In the Patent Document 1, a router is provided at a border between domains, and separates the border between layers. Therefore Patent Document 1 realizes calculation of a route. However, in the aforementioned multi-layer network, a router is not provided at a border between links.

As described above, in the conventional shortest route calculation algorithm does not have a concept of a layer hierarchy, and similarly treats both the link between same layers and the link between the upper layer and the lower layer. Therefore there is a problem in that sometimes a wrong route is determined.

Then in the multi-layer network, it is better to develop a shortest route calculation algorithm which satisfies the restriction condition for the multi-layer.

However the shortest route calculation algorithm which satisfies the restriction condition for the multi-layer needs to search a shortest route and to determine whether or not the restriction condition is satisfied. Therefore there is a problem that the algorithm become complicated.

The present invention is created in light of the aforementioned circumstances, and an object thereof is to provide a route calculation system, a network management device, a route calculation engine, a route calculation method and a program product capable of calculating a shortest route which satisfies a restriction condition of a multi-layer, without becoming complicating an algorithm for determining a shortest route, even in a multi-layer network.

SUMMARY

Means for Solving the Problem

The present invention was conceived in view of the above described circumstances, and according to one aspect of the present invention, there is provided a route calculation system comprising a network management device and a route calculation engine, the network management device comprising a topology information generation unit which generates topology information of multi-layer network, a link identification information setting unit which sets identification information to identify links of the multi-layer network, a topology information transmission unit which transmits, to the route calculation engine, the topology information of the multi-layer network generated by the topology information generation unit, a shortest route calculation request transmission unit which transmits, to the route calculation engine, a calculation request of a shortest route, a multi-layer restriction checking unit which checks a restriction condition to the shortest route information received from the route calculation engine, based on the identification information of each link set by the link identification information setting unit, and an exception link selection unit which selects an exception link when the shortest route information transmitted from the route calculation engine does not satisfy the restriction condition of the multi-layer, wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied. In addition, the route calculation engine comprising a shortest route calculation unit which calculates the shortest route based on a shortest route calculation algorithm, a topology information reception unit which receives the network topology information of the multi-layer network and sets it to the shortest route calculation unit, a shortest route calculation request reception unit which receives the calculation request of the shortest route from the network management device and makes the shortest route calculation unit calculate the shortest route, and a shortest route information transmission unit which sends, to the network management device, the shortest route information calculated by the shortest route calculation unit, wherein when the route calculation engine is requested to calculate the route calculation with exception link, the route calculation engine repeats calculating the shortest route except for the exception link and sending it to the network management device, until the restriction condition of the multi-layer is satisfied.

Moreover, in the above described route calculation system, the multi-layer restriction checking unit may use a restriction condition that two adjacent links each link is across at least a layer of the multi-layer.

Moreover, in the above described route calculation system, the multi-layer network may comprise a WDM network and a TDM network.

According to the present invention, a network management device and a route calculation engine are to co-operate, and repeat calculating a shortest route until a restriction condition for a multi-layer is satisfied, and a suitable route which satisfies the restriction condition is determined. Therefore the present invention can exactly calculate a shortest route of a multi-layer network without changing a shortest route calculation algorithm of the route calculation engine to a complicated algorithm.

DETAILED DESCRIPTION OF PREFERRED EMBODIMENTS

Figure 1:
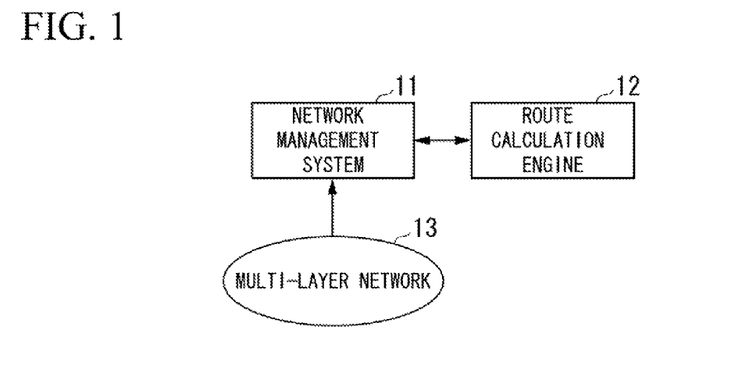
FIG. 1 is a conceptual figure showing a route calculation system according to the embodiment of the present invention.

Hereunder is a description of an embodiment of the present invention with reference to the drawings. FIG. 1 is a conceptual figure showing a route calculation system according to the embodiment of the present invention. As shown in FIG. 1, the route calculation system according to the embodiment of the present invention includes a network management device 11 and route calculation engine 12, and calculates a shortest route for a multi-layer network 13.

For example, the multi-layer network 13 is a network which includes both a layer of a WDM network and a layer of a TDM network. A configuration of layer is not limited to the layer of the WDM network and the layer of the TDM network, the configuration may be a layer of a packet network.

Figure 2:
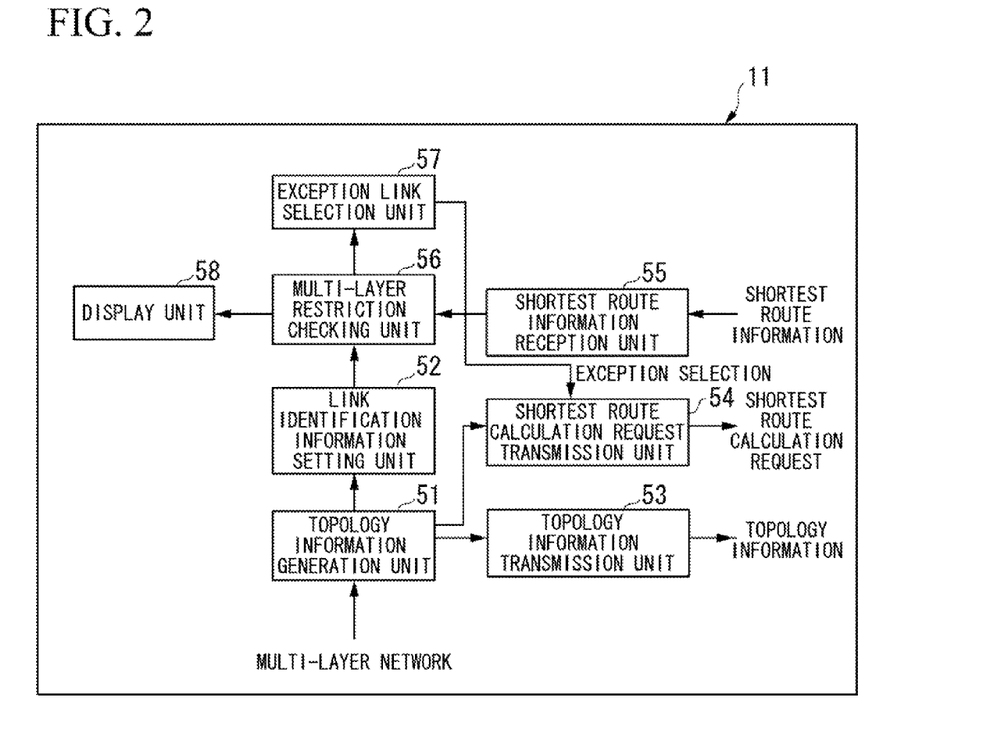
FIG. 2 is a functional block diagram showing a configuration of a network management device according to the embodiment of the present invention.

FIG. 2 is a functional block diagram showing a configuration of the network management device 11. As shown in FIG. 2, the network management device 11 includes a topology information generation unit 51, a link identification information setting unit 52, a topology information transmission unit 53, a shortest route calculation request transmission unit 54, a shortest route information reception unit 55, a multi-layer restriction checking unit 56, an exception link selection unit 57, and a display unit 58.

The topology information generation unit 51 generates a network topology information for the multi-layer network 13. In regard to the multi-layer network 13, the link identification information setting unit 52 assigns identification information to divided three links (a link between WDMs, a link between TDMs, and a link between TDM and WDM), and identifies a link which is on the same layer or a link which is across a layer.

The topology information transmission unit 53 transmits, to the route calculation engine 12, the network topology information on multi-layer network 13 generated by the topology information generation unit 51. The shortest route calculation request transmission unit 54 transmits a calculation request for a shortest route to the route calculation engine 12. The shortest route calculation request transmission unit 54 may request with an exception link selection for route calculation to the route calculation engine 12. The shortest route information reception unit 55 receives the shortest route information in reply to the shortest route calculation request from the route calculation engine 12.

The multi-layer restriction checking unit 56 checks the shortest route information sent from the route calculation engine 12, based on identification information on each link assigned by the link identification information setting unit 52, whether or not the shortest route information satisfies a restriction condition for the multi-layer. In this embodiment, the multi-layer restriction checking unit 56 checks, from an initial point to an end point, link identification information of a route which is a calculation result, and checks whether or not the restriction condition is satisfied based on the link identification. The restriction condition is whether or not links which are each across a layer are discontinuous.

When the shortest route information sent from the route calculation engine 12 is not satisfied with the restriction condition, the multi-layer restriction checking unit 56 assigns it as an exception link. In reply to this assignment of the exception link, the shortest route calculation request transmission unit 54 assigns the exception link and transmits, to the route calculation engine 12, a calculation request for a shortest route.

When the shortest route information sent from the route calculation engine 12 is satisfied with the restriction condition, the display unit 58 displays, for example, a shortest route information on the multi-layer network 13.

Figure 3:
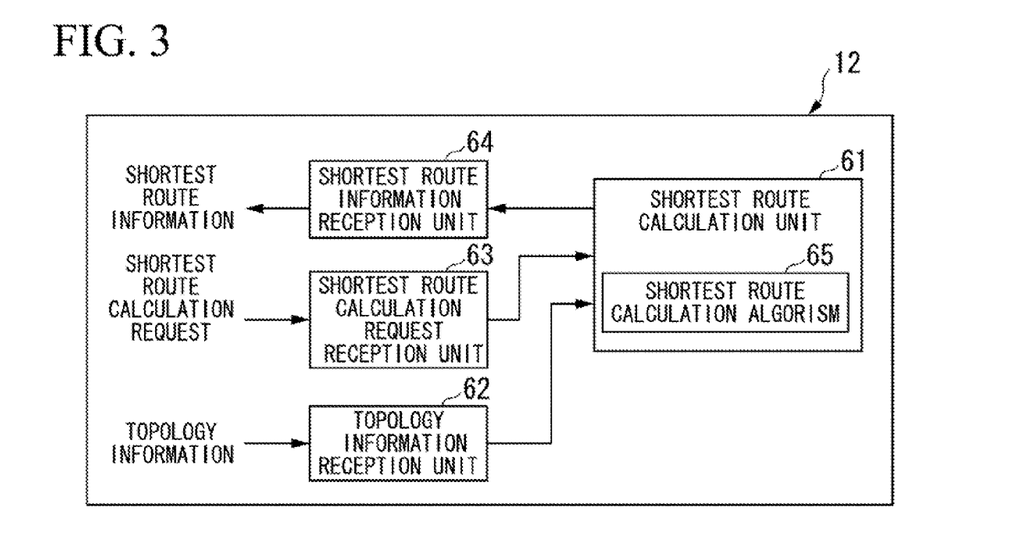
FIG. 3 is a functional block diagram showing a configuration of a route calculation engine according to the embodiment of the present invention.

FIG. 3 is a functional block diagram showing a configuration of the route calculation engine 12. As shown in FIG. 3, the route calculation engine 12 includes a shortest route calculation unit 61, a topology information reception unit 62, a shortest route calculation request reception unit 63, and a shortest route information transmission unit 64.

The shortest route calculation unit 61 calculates a shortest route based on a shortest route calculation algorithm 65. The shortest route calculation unit 61 may use a conventional shortest route calculation algorithm as the shortest route calculation algorithm 65. When the shortest route calculation unit 61 is received the route calculation request with exception link selection, the shortest route calculation unit 61 can calculate a shortest route except for a link selected as an exception link.

The topology information reception unit 62 receives the network topology information for the multi-layer network 13 from the network management device 11, and sets it to the shortest route calculation unit 61. When the shortest route information reception unit 55 receives a calculation request for a shortest route from the network management device 11, and make the shortest route calculation unit 61 calculate a shortest route. The shortest route information transmission unit 64 transmits, to the network management device 11, a shortest route information calculated by the shortest route calculation unit 61.

According to the route calculation system according to the embodiment of the present invention, the network management device 11 shown in FIG. 2, and the route calculation engine 12 shown in FIG. 3 are to co-operate, and the suitable route satisfied with the restriction for the multi-layer network is possible to be determined, even in the multi-layer network 13.

In other words, in the route calculation system according to the embodiment of the present invention, the topology information generation unit 51 of the network management device 11 shown in FIG. 2 generates network topology information on the multi-layer network 13, and the topology information transmission unit 53 transmits this topology information to the network management device 11. In addition, the link identification information setting unit 52 divides the multi-layer network 13 into three kind of links (a link between WDMs, a link between TDMs, and a link between TDM and WDM), and assigns identification information to them. In addition, the shortest route calculation request transmission unit 54 transmits the shortest route calculation request to the route calculation engine 12.

When the topology information reception unit 62 of the route calculation engine 12 shown in FIG. 3 receives the network topology information, the topology information reception unit 62 sets a condition which is used by the shortest route calculation unit 61 based on this network topology information. In addition, when the topology information reception unit 62 receives the shortest route calculation request from the shortest route calculation request transmission unit 54, the shortest route calculation unit 61 calculates the shortest route. The shortest route information transmission unit 64 transmits a calculation result to the network management device 11.

The multi-layer restriction checking unit 56 of the network management device 11 shown in FIG. 2 checks each link, to the shortest route information sent from the route calculation engine 12, whether or not the restriction condition that links which are each across a layer are discontinuous is satisfied, based on the link identification information assigned by the link identification information setting unit 52. When the restriction condition is not satisfied, the exception link selection unit 57 selects an exception link, and the shortest route calculation request transmission unit 54 transmits a request for calculating a shortest route to the route calculation engine 12 again. In addition, similar processes are repeated until the restriction condition that links which are each across a layer are discontinuous is satisfied. Therefore a shortest route which satisfies the restriction condition that links which are each across layer are discontinuous is possible to calculate.

Figure 4:
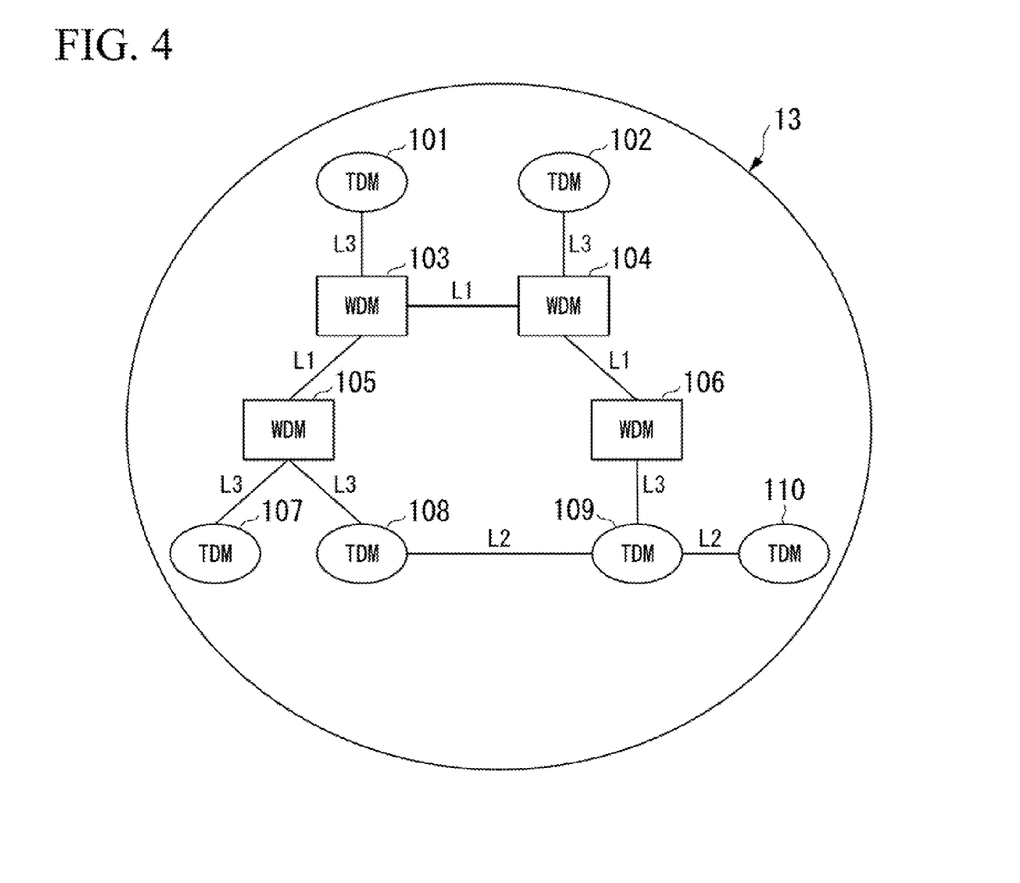
FIG. 4 is a schematic figure showing a multi-layer network of a route calculation system according to the embodiment of the present invention.

FIG. 4 is a schematic figure showing the multi-layer network 13 of a route calculation system. The multi-layer network includes a layer of the WDM network and a layer of the TDM. Communication devices 101, 102, and 107 to 110 are communication devices for the TDM. Communication devices 103 to 106 are communication devices for the WDM. A layer of the WDM network is a lower layer, and a layer of the TDM network is an upper layer.

The link identification information setting unit 52 shown in FIG. 2 assigns identification information "L1" to links between WDMs, and assigns identification information "L2" to links between TDMs, and assigns identification information "L3" to links between TDM and WDM. In this case, in the multi-layer network 13 shown in FIG. 3, identification information "L1", "L2" and "L3" are assigned to each link as shown in FIG. 5.

Figure 5:
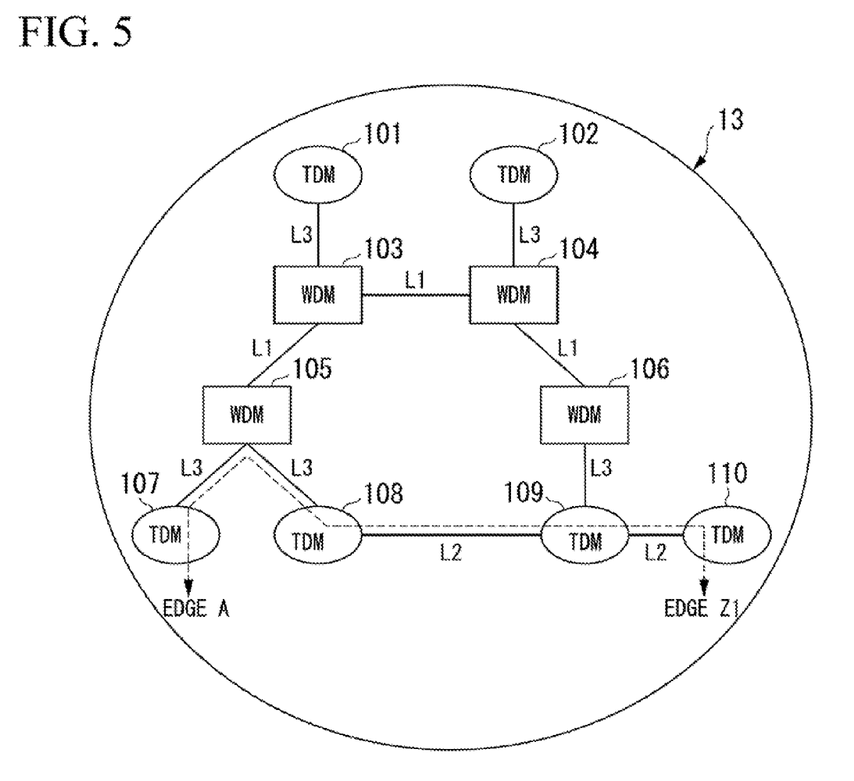
FIG. 5 is a schematic figure showing a route calculation operation of a route calculation system according to the embodiment of the present invention.
Figure 6:
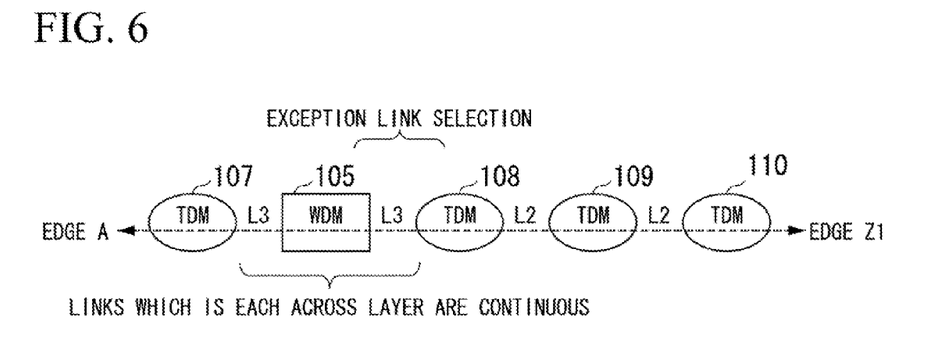
FIG. 6 is a schematic figure showing a route calculation operation of a route calculation system according to the embodiment of the present invention.

In the route calculation system according to the embodiment of the present invention, in FIG. 5, the route calculation engine 12 calculates a route from an edge A to an edge Z1, as the edge A of the communication device 107 is an initial point and the edge Z1 of the communication device 110 is an end point. In this case, a route from the edge A to the edge Z1 (the edge A, the communication device 107, the communication device 105, the communication device 108, the communication device 109, the communication device 110, and the edge Z1) is determined. As shown in FIG. 6, a link identification information of this route is "L3", "L3", "L2", and "L2". In addition, the identification information "L3" which indicate links which are each across a different layer between the TDM and the WDM, is continuous. In this case, the multi-layer restriction checking unit 56 of the network management device 11 determines the restriction condition that links which each across a layer are discontinuous is not satisfied. Therefore the end point side link (the link between the communication device 105 and the communication device 16) among continuous links which are each across a layer selected as an exception link, and calculation is performed again.

Figure 7:
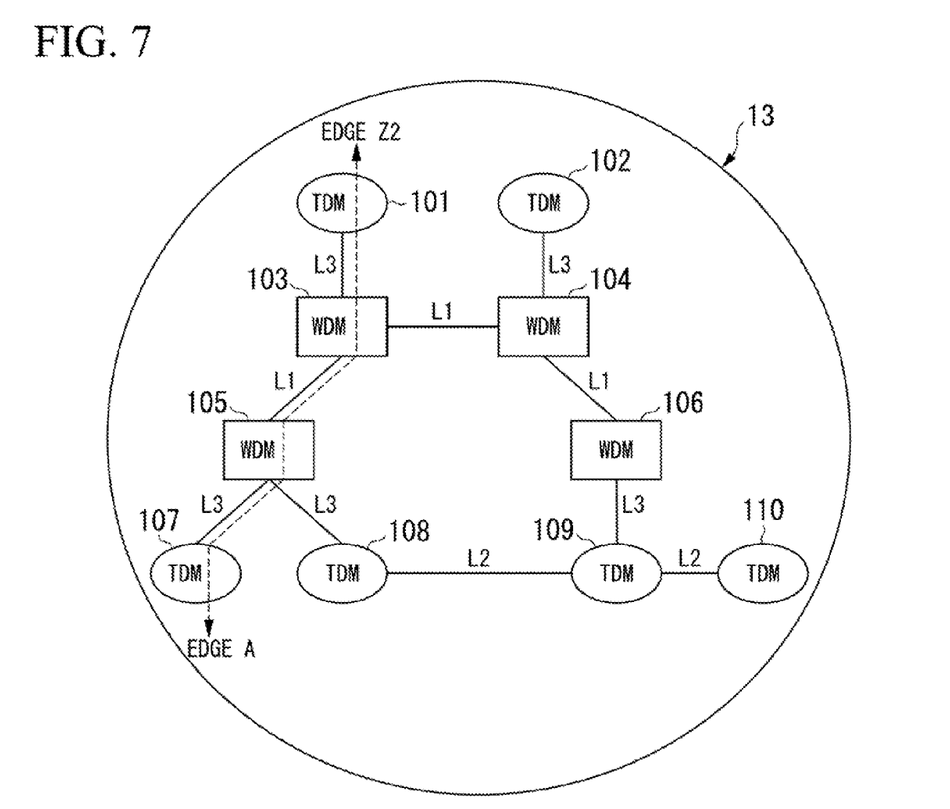
FIG. 7 is a schematic figure showing a route calculation operation of a route calculation system according to the embodiment of the present invention.
Figure 8:
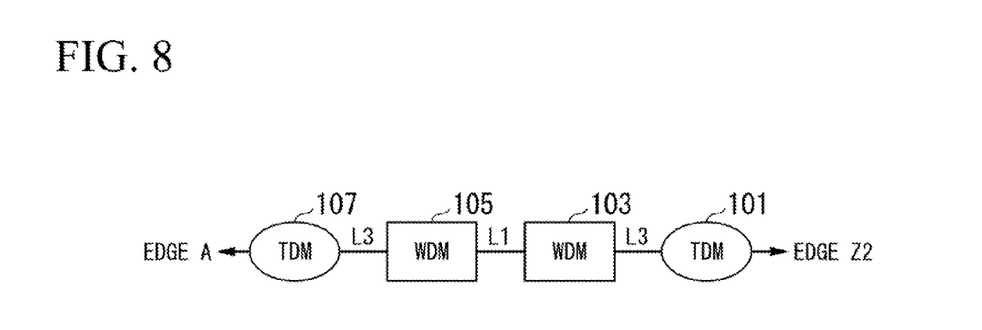
FIG. 8 is a schematic figure showing a route calculation operation of a route calculation system according to the embodiment of the present invention.

In FIG. 7, the route calculation engine 12 calculates a route from an edge A to an edge Z2, as the edge A of the communication device 107 is an initial point and the edge Z2 of the communication device 101 is an end point. In this case, a route from the edge A to the edge Z2 (the edge A, the communication device 107, the communication device 105, the communication device 103, the communication device 101, and the edge Z2) is determined. As shown in FIG. 8, a link identification information of this route is "L3", "L1" and "L3". In addition, the identification information "L3" which indicates a link between the TDM and the WDM is not continuous. In this case, the multi-layer restriction checking unit 56 of the network management device 11 determines the restriction condition that links which are each across a layer are discontinuous is satisfied, the display unit 58 displays the calculation result as a shortest route.

Figure 9:
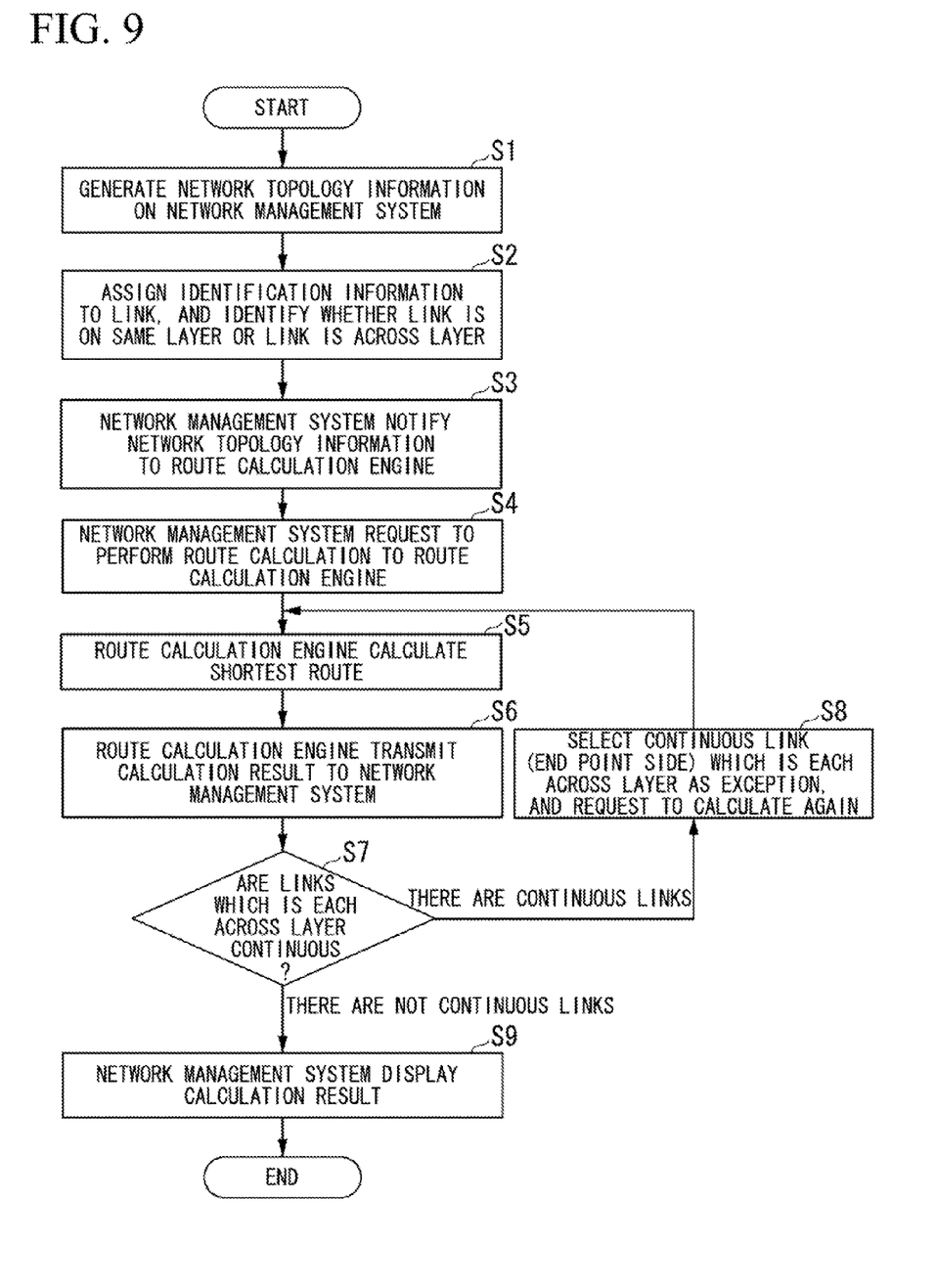
FIG. 9 is a flowchart showing an operation of a route calculation system according to the embodiment of the present invention.

FIG. 9 is a flowchart showing an operation of a route calculation system according to the embodiment of the present invention.

In FIG. 9, the network management device 11 collects topology information from the multi-layer network 13, or is inputted topology information from the network management device 11, and network topology information is generated on the network management device 11 (step S1).

The network management device 11 divides the link of the multi-layer network 13 into three kind of links (the link between WDMs, the link between TDMs, and the link between TDM and WDM), assigns link identification information to them, and identifies whether each link is on the same layer or each link is across a layer (step S2).

The network management device 11 transmits generated network topology information to the route calculation engine 12 (step S3).

The network management device 11 requests the route calculation engine 12 to calculate a shortest route based on inputted calculation condition (step S4).

When the route calculation engine 12 receives the route calculation request, the route calculation engine 12 calculates a shortest route (step S5). After the route calculation engine 12 calculates the shortest route, the route calculation engine 12 transmits the calculation result to the network management device 11 (step S6).

When the network management device 11 receives the calculation result of the shortest route, and confirms the link identification information of the route from the initial point to the end point, and checks whether or not links which each across a layer are continuous (step S7).

When links which each across a layer are continuous, the network management device 11 determines an end point side link among continuous links which each across a layer as an exception selection, and the network management device 11 requests to calculate again to the route calculation engine 12 (step S8).

The route calculation engine 12 calculates a shortest route with the exception selection (step S5), and transmits the calculation result to the network management device 11 (step S6).

The processes of step S5 to step S8 are repeated until it is determined that links which are each across a layer are discontinuous in the step S7.

When it is determined that links which are each across a layer are discontinuous in the step S7, the calculation result is displayed (step S9).

According to the route calculation system according to the embodiment of the present invention, the network management device 11 and the route calculation engine 12 are to co-operate, and repeat calculating a shortest route until the restriction condition that links which are each across a layer are discontinuous. Therefore a suitable route which satisfies the restriction condition is possible to be determined. Therefore it does not need to change a shortest route calculation algorithm to a complicated algorithm, even if a conventional shortest route calculation algorithm is used, a shortest route of the multi-layer network is exactly calculated.

While an embodiment of the present invention has been described above in detail with reference to the drawings, the specific configuration thereof is not limited to this embodiment. Designs and the like which do not depart from the spirit or scope of this invention are also included.

What is claimed is:

1. A route calculation system comprising a network management device and a route calculation engine,
the network management device comprising:
hardware;
a topology information generation unit implemented at least by the hardware and which generates topology information of multi-layer network;
a link identification information setting unit implemented at least by the hardware and which sets identification information to identify links of the multi-layer network;
a topology information transmission unit implemented at least by the hardware and which transmits, to the route calculation engine, the topology information of the multi-layer network generated by the topology information generation unit;
a shortest route calculation request transmission unit implemented at least by the hardware and which transmits, to the route calculation engine, a calculation request of a shortest route;
a multi-layer restriction checking unit implemented at least by the hardware and which checks a restriction condition to the shortest route information received from the route calculation engine, based on the identification information of each link set by the link identification information setting unit;
an exception link selection unit implemented at least by the hardware and which selects an exception link when the shortest route information transmitted from the route calculation engine does not satisfy the restriction condition of the multi-layer, and
a displaying unit implemented at least by the hardware and which displays the shortest route information in case that it is determined that the shortest route information received from the route calculation engine does not satisfy the restriction condition of the multi-layer,
wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied, and
wherein the multi-layer restriction checking unit uses a restriction condition that two adjacent links each link across at least a layer of the multi-layer,
the route calculation engine comprising:
a shortest route calculation unit which calculates the shortest route based on a shortest route calculation algorithm;
a topology information reception unit which receives the network topology information of the multi-layer network and sets it to the shortest route calculation unit;
a shortest route calculation request reception unit which receives the calculation request of the shortest route from the network management device and makes the shortest route calculation unit calculate the shortest route; and
a shortest route information transmission unit which sends, to the network management device, the shortest route information calculated by the shortest route calculation unit,
wherein when the route calculation engine is requested to calculate the route calculation with exception link, the route calculation engine repeats calculating the shortest route except for the exception link and sending it to the network management device, until the restriction condition of the multi-layer is satisfied, and wherein the multi-layer network comprises a WDM network and a TDM network.

2. A network management device comprising:
hardware;
a topology information generation unit implemented at least by the hardware and which generates topology information of multi-layer network;
a link identification information setting unit implemented at least by the hardware and which sets identification information to identify links of the multi-layer network;
a topology information transmission unit implemented at least by the hardware and which transmits, to a route calculation engine, the topology information of the multi-layer network generated by the topology information generation unit;
a shortest route calculation request transmission unit implemented at least by the hardware and which transmits, to the route calculation engine, a calculation request of a shortest route;
a multi-layer restriction checking unit implemented at least by the hardware and which checks a restriction condition to the shortest route information received from the route calculation engine, based on the identification information of each link set by the link identification information setting unit;
an exception link selection unit implemented at least by the hardware and which selects an exception link when the shortest route information transmitted from the route calculation engine does not satisfy the restriction condition of the multi-layer, and
a displaying unit implemented at least by the hardware and which displays the shortest route information in case that it is determined that the shortest route information received from the route calculation engine does not satisfy the restriction condition of the multi-layer,
wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied,
wherein the multi-layer restriction checking unit uses a restriction condition that two adjacent links each link across at least a layer of the multi-layer, and
wherein the multi-layer network comprises a WDM network and a TDM network.

3. A route calculation method using a network management device and a route calculation engine, the method comprising:
generating topology information of multi-layer network;
setting identification information to identify links of the multi-layer network;
transmitting to the route calculation engine the topology information of the multi-layer network generated topology information;
transmitting to the route calculation engine a calculation request of a shortest route;
checking a restriction condition to the shortest route information received from the route calculation engine, based on the set identification information of each link; and
selecting an exception link when the shortest route information transmitted from the route calculation engine does not satisfy the restriction condition of the multi-layer;
calculating the shortest route based on a shortest route calculation algorithm;
receiving the network topology information of the multi-layer network and sets it to the route calculation engine;
receiving the calculation request of the shortest route from the network management device, and calculating the shortest route;
sending to the network management device the calculated shortest route information, and
displaying the shortest route information in case that it is determined that the shortest route information received from the route calculation engine does not satisfy the restriction condition of the multi-layer,
wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied,
wherein when the route calculation engine is requested to calculate the route calculation with exception link, the route calculation engine repeats calculating the shortest route except for the exception link and sending it to the network management device, until the restriction condition of the multi-layer is satisfied,
wherein, in the checking, a restriction condition that two adjacent links each link across at least a layer of the multi-layer is used, and
wherein the multi-layer network comprises a WDM network and a TDM network.

4. A non-transitory computer-readable data storage medium storing a computer program that is executable by a hardware device to perform a method, the method comprising:
generating topology information of multi-layer network;
setting identification information to identify links of the multi-layer network;
transmitting to the route calculation engine the topology information of the multi-layer network generated topology information;
transmitting to the route calculation engine a calculation request of a shortest route;
checking a restriction condition to the shortest route information received from the route calculation engine, based on the set identification information of each link;
selecting an exception link when the shortest route information transmitted from the route calculation engine does not satisfy the restriction condition of the multi-layer; and
displaying the shortest route information in case that it is determined that the shortest route information received from the route calculation engine does not satisfy the restriction condition of the multi-layer,
wherein when the shortest route information received from the route calculation engine does not satisfy the restriction condition of the multi-layer, the network management device repeats setting the exception link and transmitting a re-calculation request of the shortest route, until the restriction condition of the multi-layer is satisfied,
wherein, in the checking, a restriction condition that two adjacent links each link across at least a layer of the multi-layer is used, and
wherein the multi-layer network comprises a WDM network and a TDM network.

* * * * *